Aug. 28, 1951  H. B. HASS ET AL  2,566,197
PRODUCTION OF NITRIC ACID FROM NITRIC OXIDE
Filed Oct. 12, 1948
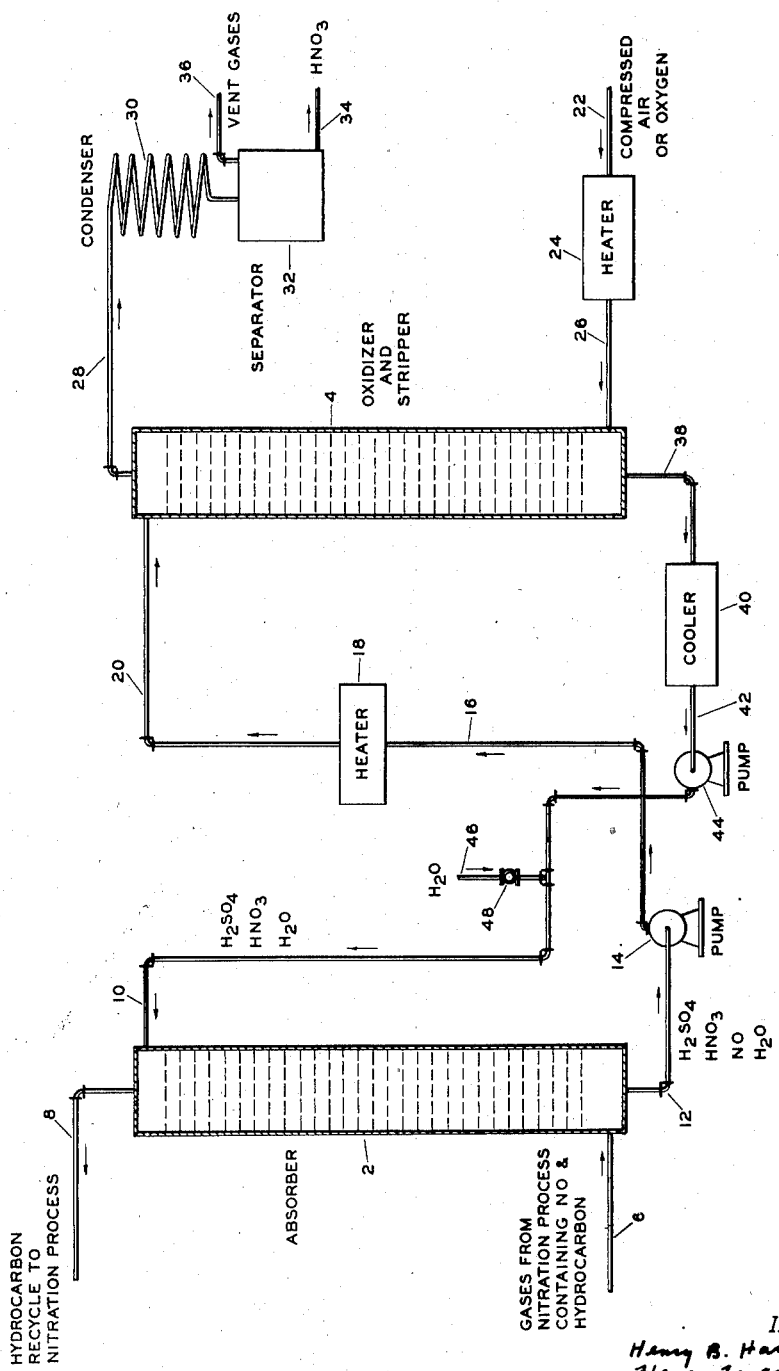
INVENTORS
Henry B. Hass
Henry Feuer
BY
Francis M. Crawford.

Patented Aug. 28, 1951

2,566,197

UNITED STATES PATENT OFFICE 2,566,197

PRODUCTION OF NITRIC ACID FROM NITRIC OXIDE

Henry B. Hass and Henry Feuer, West Lafayette, Ind., assignors to Purdue Research Foundation, La Fayette, Ind., a corporation of Indiana Application October 12, 1948, Serial No. 54,154

19 Claims. (Cl. 23—157)

This invention relates to a process for the production of nitric acid and more particularly to a process for the recovery of nitric oxide as nitric acid from the gaseous effluents of a vapor phase nitration process.

In the vapor phase nitration of normally gaseous hydrocarbons, such as methane, there results a gaseous effluent which comprises essentially unreacted hydrocarbons and nitric oxide (NO), the latter being present in amounts usually less than about 10 per cent by volume. The gaseous effluent may also contain small quantities of other gases, such as nitrogen, carbon monoxide and carbon dioxide. In order for the nitration process to be commercially feasible, it is desirable that the nitric oxide be recovered and that the normally gaseous hydrocarbon be recycled without substantial dilution with extraneous gases. The nitration process itself is one which is well known in the art and is ordinarily carried out at elevated temperatures and under superatmospheric pressure, for example, 100 pounds per square inch. In the treatment of the effluent gases from a nitration process, the step of separating the nitric oxide from the normally gaseous hydrocarbon is complicated by the fact that the nitric oxide is present in the effluent gases in relatively small amounts, that is, less than about 10 per cent by volume. For this reason, it has been difficult to separate and recover substantially all of the nitric oxide and to recycle to the nitration process a substantially undiluted hydrocarbon gas from which the nitric oxide has been substantially completely removed.

Accordingly, it is one object of this invention to provide a process for the preparation of nitric acid from gases containing nitric oxide.

A further object of this invention is the provision of a continuous method for the recovery of nitric oxide as nitric acid from the effluent gases of a hydrocarbon nitration process.

A still further object of this invention is the provision of a process for removing nitric oxide from a mixture of nitric oxide and a normally gaseous hydrocarbon, such as methane, wherein the normally gaseous hydrocarbon is not substantially diluted by extraneous gaseous materials.

A further and additional object of this invention is the provision of a process for the removal of nitric oxide by selective absorption in a solution which is capable of being regenerated for further use and from which the nitric oxide may be recovered as nitric acid.

Further and additional objects of this invention will appear from the following description, the accompanying drawing and the appended claims.

In accordance with this invention it has been discovered that nitric oxide may be readily absorbed in a solution comprising sulfuric acid, water and nitric acid and that, if the relative proportions of the constituents of the solution are held within certain well defined limits, the nitric oxide contained therein may be oxidized to form in the solution additional quantities of nitric acid. The solution may then be processed to remove a portion of the nitric acid so formed and the processed solution recycled to the nitric oxide absorbing step.

It is well known in the art that oxides of nitrogen may be absorbed under certain conditions by concentrated sulfuric acid. However, the use of concentrated sulfuric acid in a nitric oxide recovery process is not feasible for no procedure has heretofore been suggested whereby the nitric oxide can again be separated from the concentrated sulfuric acid and the sulfuric acid be reused in an absorption step. A particular feature of this invention is the discovery that a solution having controlled percentages of sulfuric acid, water and nitric acid within certain well defined limits can be effectively employed for the nitric oxide absorption step and is capable of regeneration by oxidation to liberate additional quantities of nitric acid which may partially be removed by distillation and the solution then be recycled to the absorption step. In accordance with this invention, the absorption solution should contain between about 40 and about 50 weight per cent of sulfuric acid, between about 35 and about 45 weight per cent of water, and about 5 to about 25 weight per cent of nitric acid. Preferably the nitric acid content should range between about 7 and about 13 per cent.

When a sulfuric acid-water-nitric acid solution having the above indicated composition is contacted with a gas containing nitric oxide in accordance with this invention, the nitric oxide is readily absorbed. It is believed that the absorption step involves the following chemical reaction:

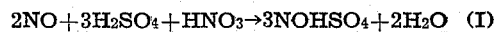

When the solution containing the absorbed nitric oxide, which in accordance with the above equation (I) is believed to be present as nitrosylsulfuric acid, is oxidized by an oxygen-containing gas, additional quantities of nitric acid are formed in the solution with the corresponding disappearance of nitric oxide or nitrosylsulfuric acid. The chemical reaction involved in the oxidizing step is believed to be represented by the following equation:

$$3NOHSO_4 + 3/2 O_2 + 3H_2O \rightarrow 3HNO_3 + 3H_2SO_4 \quad (II)$$

Combining the two above indicated equations, it will be noted that the over-all absorption-oxidation reaction may be represented as follows:

$$2NO + 3/2 O_2 + H_2O \rightarrow 2HNO_3 \quad (III)$$

It will be observed that in the combined absorption-oxidation process two moles of nitric oxide are oxidized to two moles of nitric acid thereby increasing the over-all concentration of nitric acid in the absorbing solution. Also from a consideration of Equation I, it will be noted that some nitric acid is required in the original absorption solution to result in the formation of the nitrosylsulfuric acid. In accordance with one embodiment of this invention, it has been discovered that the amount of nitric acid in the absorbing solution should be between about 5 and about 25 per cent by weight and preferably between about 7 and 13 per cent by weight. Because of the fact that nitric acid is continuously produced in the absorption-oxidation reaction, it is desired that means be provided for the removal of a portion of the nitric acid from the oxidized solution and the latter then recycled to the absorption step, thereby providing a continuous operation. In accordance with one embodiment of this invention, this nitric acid removal may be effected by distillation and the distillation may be effected in the same reaction zone in which the oxidation step is being carried out.

Further consideration of the above indicated equations will also reveal that there is an over-all consumption of water in the absorption-oxidation process and accordingly it has been found to be necessary to add water from time to time to the absorption solution in order to maintain the percentage ratios previously indicated. Also a certain amount of water may be carried over with the nitric acid in the final distillation step and the water added to the solution will also serve to compensate for such water as may be lost during this distillation.

For a more complete understanding of this invention, reference will now be made to the drawing which is a schematic showing of one form of apparatus wherein the process may be carried out. However, it will readily be apparent that this particular modification may be widely varied without departing from the scope of this invention as defined in the appended claims.

With particular reference to the drawing, there is provided an absorber 2 and a combined oxidizer and stripper tower 4, each of which may comprise towers that are well known in the art for the absorption or other treatment of gases with liquids. Bubble towers or packed columns suitable for contacting gases with strongly acid solutions may be employed.

In accordance with this invention, gases from a nitration process containing essentially nitric oxide (in an amount less than about 10 per cent by volume) and a normally gaseous hydrocarbon, such as methane, together with small amounts of nitrogen, carbon monoxide and carbon dioxide are passed into the bottom of absorber 2 through line 6. Ordinarily the gases so introduced are under a pressure of about 100 pounds per square inch which corresponds to the pressure obtaining in the nitration zone. Unabsorbed gases comprising essentially the normally gaseous hydrocarbons, such as methane, are withdrawn from the top of the absorber 2 through line 8 and are preferably recycled to the nitration process. Into the top of absorber 2 through line 10 is introduced a solution which may contain 46 weight per cent sulfuric acid, 44 weight per cent water and 10 weight per cent nitric acid. As previously indicated, the weight percentages of sulfuric acid and water may vary by plus or minus 5 per cent and the weight percentage of nitric acid may vary by plus or minus 3 per cent. Thus the composition of the solution introduced into the top of absorber 2 through line 10 falls within the range of about 40 to about 50 per cent by weight of sulfuric acid, about 35 to about 45 per cent by weight of water and about 5 to about 25 per cent by weight (preferably about 7 to about 13 per cent by weight) of nitric acid. The solution introduced through line 10 flows downwardly through the absorber 2 in countercurrent intimate direct contact with the upwardly flowing gases introduced through line 6. The height of the absorber 2 is chosen so that substantially all of the nitric oxide contained in the gaseous mixture is absorbed in the solution by the time the gas reaches the top of the absorber. The temperature of the solution within the absorber should be maintained at a value below about 35° C. in order to obtain efficient absorption of the nitric oxide. If desired, the temperature of the absorber may be as low as the freezing point of the solution passing therethrough. However, economic considerations will usually dictate that the temperature of the absorber be maintained at about 15° C.

The absorbing solution containing the nitric oxide (presumably as nitrosylsulfuric acid) is withdrawn from the lower portion of the absorber 2 through line 12, pump 14, and line 16 to heater 18 wherein the temperature of the solution is raised to between about 50° and about 150° C., suitably 100° C. The heated enriched solution is then passed through line 20 into the top of the oxidizer and stripper tower 4 and allowed to flow downwardly therethrough in countercurrent flow relationship with compressed air or oxygen introduced into the bottom of the tower 4 through line 22, heater 24 and line 26. Heaters 18 and 24 are controlled so that the temperature within the tower 4 is maintained between about 50° C. and 150° C., suitably at about 100° C. In any case the temperature should be below the decomposition temperature of the nitric acid. The oxygen introduced into the bottom of tower 4 through line 26 intimately contacts the nitric oxide-enriched solution introduced at the top through line 20. The oxygen and the water within the solution react with the absorbed nitric oxide (presumed to be present as nitrosylsulfuric acid) to form additional quantities of nitric acid. A portion of the nitric acid in the heated solution passing through tower 4 is distilled at the temperature and pressure maintained and the nitric acid-containing vapors escape from the top of the tower through line 28 to the condenser 30 and the separator 32. Nitric acid may be withdrawn from the separator through line 34 and any vent gases may be withdrawn from the system through line 36.

The distillation in tower 4 is controlled by adjusting the temperature, pressure and flow rates so that only a portion of the nitric acid is stripped from the solution and so that the solution discharged from the tower 4 through a bottom discharge line 38 will have substantially the proportion of sulfuric acid and nitric acid that is desired for the solution in the absorber 2, e. g. greater than about 7 weight per cent of nitric acid. The stripped solution is passed from line 38 to a cooler 40 wherein the temperature of the solution is reduced to substantially that temperature at which the absorber is being maintained. The solution is then passed through line 42, pump 44 and line 10 to the top of absorber 2 as previously described. Make-up water may be added to the solution passing through line 10 by means of line 46 controlled by valve 48.

It will be apparent from the foregoing description that a continuous cyclic process has been provided for removing nitric oxide from a gas containing mixtures of the same. The process specifically disclosed above is particularly useful in the recovery of effluent gases from a hydrocarbon nitration process wherein it is desired to recycle the hydrocarbons to the nitration step without substantial dilution by other gases. The hydrocarbon may be any normally gaseous hydrocarbon of the methane series, such as methane, ethane, propane, etc. In cases, however, where it is not necessary to prevent the dilution of the unabsorbed gases, the oxidation may be effected directly within the absorbing zone. In such an event the absorber 2 is provided with means for introducing an oxygen-containing gas thereinto so that within the absorber the nitric oxide is first absorbed and then converted to nitric acid. The nitric acid-enriched solution is then cycled to a nitric acid stripping zone.

In accordance with another embodiment of this invention, the apparatus for effecting the process may be modified so that the nitric oxide oxidation and the nitric acid stripping are carried out in separate zones. This may be desirable in certain instances to prevent desorbed but unoxidized nitric oxide from being carried over with the nitric acid during the distilling or stripping operation. In the specific embodiment shown, only one tower is shown for each of the absorbing step and the oxidizing and stripping step. It will, of course, be apparent that as many towers may be employed arranged either in series or in parallel, as may be necessary for effecting the substantially complete removal of nitric oxide from the initial gases being treated and for the substantially complete oxidation of the nitric oxide in the solution undergoing oxidation and stripping prior to recycle to the absorbing step.

As previously indicated, an important feature of this invention is the provision of an absorbent solution which is both capable of absorbing nitric oxide from a dilute mixture of nitric oxide in an inert gas, such as methane, and which is capable of ready regeneration. Such a solution has been achieved by this invention. The concentrations of sulfuric and nitric acid within the ranges herein specified permit the ready absorption of the nitric oxide, and the concentration of the water when adjusted within the range specified will permit the nitric oxide to be readily converted to nitric acid in the solution upon treatment with an oxygen-containing gas. Thus, if more than about 50 weight per cent of water is present in the absorbing solution, the power of the solution to absorb nitric oxide is markedly decreased. On the other hand, if less than about 35 weight per cent of water is present, then the ability of the solution to become desorbed of nitric oxide (by oxidation to nitric acid) is markedly diminished.

The pressures employed throughout the absorption zone may be atmospheric or superatmospheric. Ordinarily superatmospheric pressures corresponding to the pressure in a hydrocarbon nitration zone will be employed. This is particularly desirable in the absorber wherein the rate of absorption is increased by increase in pressure, as is well recognized in the art. Such a pressure may correspond to about 100 pounds per square inch.

In the oxidizer and stripper zone the pressure may also be atmospheric or superatmospheric. If pure oxygen is introduced into the oxidation zone as the oxidizing gas, then the pressure may be somewhat reduced over the pressure desired if air is employed as the oxidizing gas.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

What is claimed is:

1. A process for the production of nitric acid which comprises contacting a gas containing nitric oxide with a solution comprising essentially about 40 to about 50 weight per cent of sulfuric acid, about 35 to about 45 weight per cent of water and about 5 to about 25 weight per cent of nitric acid whereby nitric oxide is absorbed in said solution, contacting an oxygen-containing gas with the resulting solution whereby an additional amount of nitric acid is formed therein, and removing at least a portion of said nitric acid from said resulting solution.

2. A process for the production of nitric acid which comprises contacting a gas containing nitric oxide with a solution comprising essentially about 40 to about 50 weight per cent of sulfuric acid, about 35 to about 45 weight per cent of water and about 5 to about 25 weight per cent of nitric acid whereby said nitric oxide is absorbed in said solution, thereafter contacting an oxygen-containing gas with the resulting solution whereby an additional amount of nitric acid is formed therein, and distilling nitric acid from said resulting solution.

3. A process for the production of nitric acid which comprises contacting a gas containing nitric oxide with a solution comprising essentially about 40 to about 50 weight per cent of sulfuric acid, about 35 to about 45 weight per cent of water, and about 7 to about 13 weight per cent of nitric acid whereby a substantial proportion of said nitric oxide is absorbed in said solution, thereafter contacting an oxygen-containing gas with the resulting solution whereby an additional amount of nitric acid is formed therein, distilling said resulting solution to reduce the nitric acid content thereof to a value not less than about 7 weight per cent, recovering the nitric acid so distilled, and recycling the residue from said distillation to the first mentioned contacting step.

4. The process recited in claim 3 wherein make-up water is added to said solution during the process in amounts to maintain the water percentage within the range specified.

5. A process for the production of nitric acid which comprises contacting a gas containing nitric oxide in an absorption zone with a solution comprising essentially about 40 to about 50 weight per cent of sulfuric acid, about 35 to about 45 weight per cent of water, and about 7 to about 13 weight per cent of nitric acid, said absorption zone being maintained at a temperature below about 35° C., passing the resulting solution to an oxidizing zone, contacting said resulting solution in said oxidizing zone wth an oxygen-containing gas whereby an additional amount of nitric acid is formed therein, distilling said resulting solution to reduce the nitric acid content thereof to a value not less than about 7 weight per cent, recovering the nitric acid so distilled, and recycling the residue from said distillation to said absorption zone.

6. The process recited in claim 5 wherein the distilling step is effected at a temperature below the decomposition temperature of nitric acid.

7. The process recited in claim 5 wherein the distilling step is effected in the oxidizing zone simultaneously with the contacting of said resulting solution with said oxygen-containing gas.

8. A continuous process for the production of nitric acid which comprises continuously passing a gas containing nitric oxide into an absorption zone mantained at a temperature below about 35° C. with a solution comprising essentially about 40 to about 50 weight per cent of sulfuric acid, about 35 to about 45 weight per cent of water, and about 7 to about 13 weight per cent of nitric acid whereby to absorb a substantial proportion of said nitric oxide, passing the resulting solution to an oxidizing-stripping zone maintained at a temperature between about 50° C. and about 150° C., contacting said resulting solution in said oxidizing-stripping zone with an oxygen-containing gas whereby an additional amount of nitric acid is formed therein, simultaneously distilling a portion of the nitric acid from the solution in said oxidizing-stripping zone to reduce the nitric acid content to a value not less than about 7 weight per cent, recovering the nitric acid so distilled, recycling the residue solution from the oxidizing-stripping zone to said absorption zone, and adding make-up water to the solution as may be required in amounts to maintain the water percentage within the range specified.

9. A process for the recovery of nitric oxide as nitric acid from a gaseous mixture comprising an inert gas and less than about 10 per cent by volume of nitric oxide which comprises contacting said gaseous mixture with a solution comprising essentially about 40 to about 50 weight per cent of sulfuric acid, about 35 to about 45 weight per cent of water and above about 7 weight per cent of nitric acid whereby selectively to absorb a substantial proportion of the nitric oxide from said gaseous mixture, contacting the resulting solution with an oxygen-containing gas whereby an additional amount of nitric acid is formed therein, and recovering a portion of said nitric acid from said solution.

10. A process for the recovery of nitric oxide as nitric acid from a gaseous mixture comprising an inert gas and less than about 10 per cent by volume of nitric oxide which comprises contacting said gaseous mixture at a temperature below about 35° C. with a solution comprising essentially about 40 to about 50 weight per cent of sulfuric acid, about 35 to about 45 weight per cent of water and above about 7 weight per cent of nitric acid, containing said solution with an oxygen-containing gas whereby an additional amount of nitric acid is formed therein, distilling a portion of nitric acid from the solution, and recovering the nitric acid so distilled.

11. A process for the recovery of nitric oxide as nitric acid from a gaseous mixture comprising an inert gas and less than about 10 per cent by volume of nitric oxide which comprises contacting said gaseous mixture at a temperature below about 35° C. with a solution comprising essentially about 40 to about 50 weight per cent of sulfuric acid, about 35 to about 45 weight per cent of water and about 7 to about 13 weight per cent of nitric acid, contacting said solution with an oxygen-containing gas whereby an additional amount of nitric acid is formed therein, distilling a portion of nitric acid from said solution at a temperature between about 50° C. and about 150° C. to reduce the nitric acid content thereof to a value not less than about 7 weight per cent, recovering the nitric acid so distilled, and cycling at least a portion of the residue from the distilling step to the first-mentioned contacting step.

12. A continuous process for the recovery of nitric oxide as nitric acid from a gaseous mixture comprising an inert gas and less than about 10 per cent by volume of nitric oxide which comprises passing said gaseous mixture through a nitric oxide absorption zone in countercurrent flow relationship with and in intimate contact with an absorbing solution comprising essentially about 40 to about 50 weight per cent of sulfuric acid, about 35 to about 45 weight per cent of water and about 7 to about 13 weight per cent of nitric acid, said solution in said absorption zone being maintained at a temperature below about 35° C., continuously removing nitric oxide-enriched solution from said absorption zone, heating said nitric oxide-enriched solution and passing it to an oxidizing-stripping zone wherein the temperature of the solution therein is maintained at between about 50° C. and 150° C., passing an oxygen-containing gas through said oxidizing-stripping zone in countercurrent flow relationship with and in intimate contact with said solution whereby an additional amount of nitric acid is formed and whereby nitric acid is distilled from said oxidizing-stripping zone in an amount to maintain the nitric content of the solution therein at a value not below about 7 weight per cent, recovering the nitric acid so distilled, withdrawing residual solution from the oxidizing-stripping zone, cooling said residual solution and recycling the cooled solution to said absorption zone with water added in an amount to maintain the water percentage within the range above specified.

13. The process recited in claim 12 wherein the inert gas in said gaseous mixture comprises essentially a normally gaseous hydrocarbon.

14. A process for the treatment of a gaseous effluent from a hydrocarbon nitration process, said effluent comprising essentially a normally gaseous hydrocarbon and less than about 10 volume per cent of nitric oxide, which comprises contacting said effluent with a solution comprising essentially about 40 to about 50 weight per cent of sulfuric acid, about 35 to about 45 weight per cent of water and over about 7 weight per cent of nitric acid in an absorption zone whereby nitric oxide is absorbed in said solution withdrawing unabsorbed gaseous hydrocarbon from the absorption zone without substantial dilution for recycle to the nitration process, passing nitric oxide-enriched solution from said absorption zone to an oxidizing zone wherein said solution is oxidized to form additional amounts of nitric acid therein, distilling said solution to reduce the nitric acid content thereof to a value not less than about 7 weight per cent, recovering the nitric acid so distilled, and cycling at least a portion of the residue from the distilling step to the absorption zone.

15. The process recited in claim 14 wherein said gaseous hydrocarbon is methane.

16. The process recited in claim 14 wherein said absorption zone is maintained at a temperature below about 35° C. and wherein the distilling step is effected at a temperature between about 50° C. and about 150° C.

17. A process for the treatment of a gaseous effluent from a superatmospheric methane nitration process, said effluent comprising essentially methane and less than about 10 volume per cent of nitric oxide, which comprises contacting said effluent at superatmospheric pressure and at a temperature below about 35° C. with a solution comprising essentially about 40 to about 50 weight per cent of sulfuric acid, about 35 to about 45 weight per cent of water and about 7 to 13 weight per cent of nitric acid in an absorption zone whereby nitric oxide is absorbed in said solution, withdrawing unabsorbed methane from the absorption zone without substantial dilution for recycle to the nitration process, passing nitric oxide-enriched solution from said absorption zone to an oxidizing-stripping zone maintained at a temperature between about 50° C. and about 150° C., passing an oxygen-containing gas through said oxidizing-stripping zone whereby additional amounts of nitric acid are formed in said solution and whereby nitric acid is distilled from said oxidizing-stripping zone in an amount to reduce the nitric acid content of the solution therein to a value not below about 7 weight per cent, condensing and recovering the nitric acid so distilled, withdrawing residual solution from the oxidizing-stripping zone, and recycling the withdrawn solution to the absorption zone.

18. The process recited in claim 17 wherein said nitric oxide-enriched solution is heated during passage from the absorption zone to the oxidizing-stripping zone and wherein the recycle solution is cooled prior to reintroduction into the absorption zone.

19. The process recited in claim 17 wherein make-up water is added to the recycle solution to maintain the water percentage within the range specified.

HENRY B. HASS.
HENRY FEUER.

REFERENCES CITED

The following references are of record in the file of this patent:

UNITED STATES PATENTS

| Number | Name | Date |
|---|---|---|
| 1,120,436 | Bergfeld | Dec. 8, 1914 |
| 1,264,512 | Hechenbleikner | Apr. 30, 1918 |
| 1,756,532 | Battegay | Apr. 29, 1930 |
| 2,053,834 | Kachkaroff et al. | Sept. 8, 1936 |
| 2,346,441 | Lippincott | Apr. 11, 1944 |

FOREIGN PATENTS

| Number | Country | Date |
|---|---|---|
| 156,799 | Great Britain | May 8, 1922 |